(12) United States Patent  
Ahmad et al.

(10) Patent No.: US 9,104,423 B2
(45) Date of Patent: Aug. 11, 2015

(54) METHOD AND SYSTEM FOR ADVANCE WAKEUP FROM LOW-POWER SLEEP STATES

(75) Inventors: Sagheer Ahmad, Cupertino, CA (US); Jay Kishora Gupta, Milpitas, CA (US); Laurent Rene Moll, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 54 days.

(21) Appl. No.: 13/473,042

(22) Filed: May 16, 2012

(65) Prior Publication Data

US 2013/0311797 A1    Nov. 21, 2013

(51) Int. Cl.
*G06F 1/32* (2006.01)
*G06F 9/44* (2006.01)

(52) U.S. Cl.
CPC .............. *G06F 1/329* (2013.01); *G06F 1/3209* (2013.01); *G06F 9/4418* (2013.01); *Y02B 60/144* (2013.01)

(58) Field of Classification Search
CPC .............................. G06F 1/3203; G06F 1/3287
USPC .................................. 713/320, 322, 323, 324
See application file for complete search history.

(56) References Cited

U.S. PATENT DOCUMENTS

| | | | |
|---|---|---|---|
| 5,848,281 A | 12/1998 | Smalley et al. | |
| 6,795,781 B2 * | 9/2004 | Aldridge et al. | 702/60 |
| 6,978,362 B2 | 12/2005 | Muth | |
| 7,100,062 B2 | 8/2006 | Nicholas | |
| 7,278,705 B2 | 10/2007 | Ohara | |
| 7,295,827 B2 | 11/2007 | Liu | |
| 7,941,682 B2 | 5/2011 | Adams | |
| 8,145,928 B2 * | 3/2012 | de Cesare et al. | 713/320 |
| 8,188,851 B2 | 5/2012 | Haartsen | |
| 8,526,604 B2 | 9/2013 | Batra et al. | |
| 8,850,252 B2 | 9/2014 | Doshi et al. | |
| 2004/0250147 A1 | 12/2004 | Chang | |
| 2006/0090088 A1 | 4/2006 | Choi et al. | |
| 2007/0005824 A1 | 1/2007 | Howard | |
| 2008/0005446 A1 | 1/2008 | Frantz et al. | |
| 2008/0168285 A1 * | 7/2008 | de Cesare et al. | 713/320 |
| 2008/0263318 A1 * | 10/2008 | May et al. | 712/23 |
| 2009/0111524 A1 | 4/2009 | Basaralu | |
| 2009/0259861 A1 * | 10/2009 | Tune | 713/320 |
| 2010/0067416 A1 * | 3/2010 | Gao et al. | 370/311 |
| 2010/0067421 A1 | 3/2010 | Gorokhov | |
| 2011/0161711 A1 | 6/2011 | Takamoto | |
| 2012/0084592 A1 | 4/2012 | Lin et al. | |
| 2012/0167118 A1 | 6/2012 | Pingili | |
| 2012/0284537 A1 * | 11/2012 | Kruglick | 713/300 |
| 2013/0111242 A1 * | 5/2013 | Heller et al. | 713/323 |

(Continued)

OTHER PUBLICATIONS

"Intel® I/O Controller Hub 1 0 (ICH1 0) Family". Oct. 2008. Intel Corporation. Document No. 319973-003.

(Continued)

*Primary Examiner* — Vincent Tran

(57) ABSTRACT

A system and method for power management by providing advance notice of events. The method includes snooping a register of an operating system timer to determine a timer period associated with a scheduled event. A unit of a computer system is identified that is in a low power state. A wake up latency of the unit is determined that is based on the low power state. An advance period is determined based on the wake up latency. An advance notice of the operating system timer is triggered based on the timer period and the advance period to wake up the unit.

7 Claims, 8 Drawing Sheets

(56) References Cited

U.S. PATENT DOCUMENTS

2013/0179612 A1* 7/2013 Feekes .................... 710/106
2013/0198540 A1* 8/2013 Lee et al. ................. 713/320
2013/0290760 A1 10/2013 Cooper et al.

OTHER PUBLICATIONS

"Universal Host Controller Interface (UNCI) Design Guide". Revision 1.1. Mar. 1996. Intel Corporation.

"Low Power Function of Mobile Ram Partial Array Self Refresh (PASR)". Version 1.0. Nov. 2005. Elpida Memory, Inc. Document No. E0697E1 O.

Stern, Alan. "USB device peristence during system suspend". Online Feb. 25,2008. Retrieved from Internet Dec. 3, 2013. <http://www.cs.fsu.edu/-baker/devices/lxr/http/sou rce/li nuxIDocu mentation/usb/persist.txt>.

"Universal Serial Bus Specification". Revision 2.0. Apr. 27, 2000. Compaq Computer Corporation et al.

Power Management of US Host Controllers, Microsoft Corporation, Aug. 30, 2004, p. 8.

* cited by examiner

METHOD AND SYSTEM FOR ADVANCE WAKEUP FROM LOW-POWER SLEEP STATES

BACKGROUND

To optimize power consumption, a processor system can be power gated or clock gated when idled for a period of time. In some situations, power gating or clock gating may be managed through software control. As such, power management may be achieved by explicitly entering low power states through software control. For instance, power gating may be achieved by gating power field effect transistors (FETs) to an off condition, wherein the power FETs control distribution of power to the processor system. In addition, power saving may be achieved by gating a clock signal that is distributed throughout the processor system. Without an active clock signal, the processor system will idles and consume a minimum amount of power.

The processor system may be placed into various degrees of low power states. The selection of the depth of the low power state selected depends on how quickly the processor system is required to be activated from that state. That is, when the processor system needs to wake up, such as due to some wake event like a periodic timer interrupt, then powering on and restoring context adds to the latency of a wake up process. The deeper the lower power state, the more time is required in waking up the processor system. As such, if the processor system is able to tolerate a longer wake up period, then the processor system may be placed into a deeper low power state. On the other hand, if the processor is only able to tolerate a short wake up period, then the processor system may be placed into a shallower low power state.

Additionally, in some situations the user experience will affect how deep of a lower power state to put the processor system. It may be determined that the user experience is poor when there is too long of a wake up latency period coming out of a low power state. In that case, power savings is sacrificed as the processor system may be placed into a shallower low power state to achieve lower wake up latencies for purposes of giving a better user experience.

However, in order to satisfy the various constraints, the processor system is placed in more shallow low power states. This undermines the goal of achieving the lowest possible low power state so that the most power is saved in the least amount of time.

It is desirous to put the processor system in the deepest lower power state possible for the longest possible amount of time. This allows for the most power saving to be achieved.

SUMMARY

A computer implemented method and system for performing power management are disclosed. The computer implemented method includes a timer advance notice technique to wake up (e.g., power-on and restore context) various units of a computer system, such as, a core and uncore configurations in anticipation of a scheduled wake event. The method includes snooping a register of an operating system timer to determine a timer period associated with the scheduled event. A unit of a computer system is identified that is in a low power state. A wake up latency of the unit is determined that is based on the low power state. An advance period is determined based on the wake up latency. An advance notice of the operating system timer is triggered based on the timer period and the advance period to wake up the unit.

In another embodiment, another method for power management is disclosed. The computer implemented method includes a timer advance notice technique to wake up (e.g., power-on and restore context) various units of a computer system, such as, core and uncore configurations, in the occurrence of a non-timer or non-scheduled event (e.g., interrupt or direct memory access request). The method includes configuring a system power management unit (SPMU) to intercept communication from an external device over a link, wherein said SPMU manages power to one or more units of a computer system. The method also includes intercepting at the SPMU a signal indicating a non-timer wake event, wherein the signal originates from the external device, and is received while a unit of the computer system is in a low power state. An advance notice of the event is triggered in order to wake up the unit.

In still another embodiment, a method for power management is disclosed to provide a buffer triggered wake advance notice that is implemented for handling communications from external devices when one or more units of a computer system are in low power states. The computer implemented method includes configuring a unit comprising an internal buffer to process data from the internal buffer. While this unit is processing data from internal buffer, the rest of the system can be put in low power state. A system power management unit (SPMU) is configured for managing power delivered to a memory controller. The SPMU is used to place the memory controller into a low power state. An occupancy state of the buffer is determined. The method includes determining when the occupancy reaches a threshold corresponding to the low power state as a buffer event. The SPMU is informed of the buffer event. Also, the SPMU is configured to wake up the memory controller based on the buffer event.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
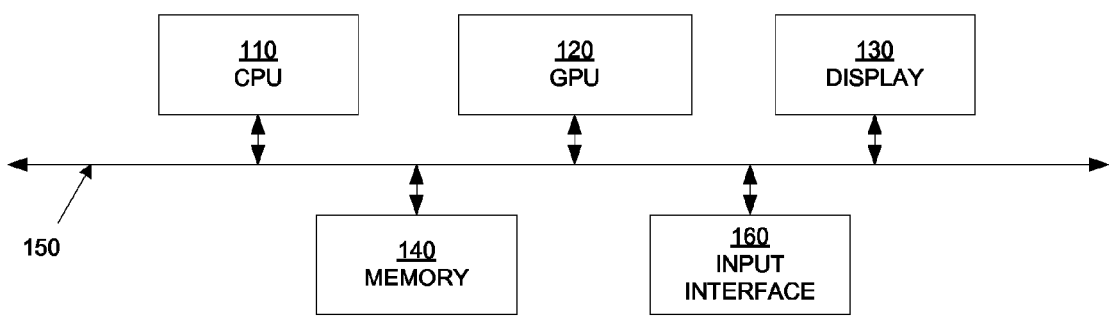
FIG. 1 depicts a block diagram of an exemplary computer system suitable for implementing the present methods, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "configuring," "intercepting," "triggering," "snooping," "determining," or the like, refer to actions and processes (e.g., flowcharts 400, 500A, and 600A of FIGS. 4, 5A, and 6A, respectively) of a computer system or similar electronic computing device or processor (e.g., system 100, 200, 500B, and 600B of FIGS. 1, 2, 5A, and 5B, respectively). The computer system or similar electronic computing device manipulates and transforms data represented as physical (electronic) quantities within the computer system memories, registers or other such information storage, transmission or display devices.

Figure 4:
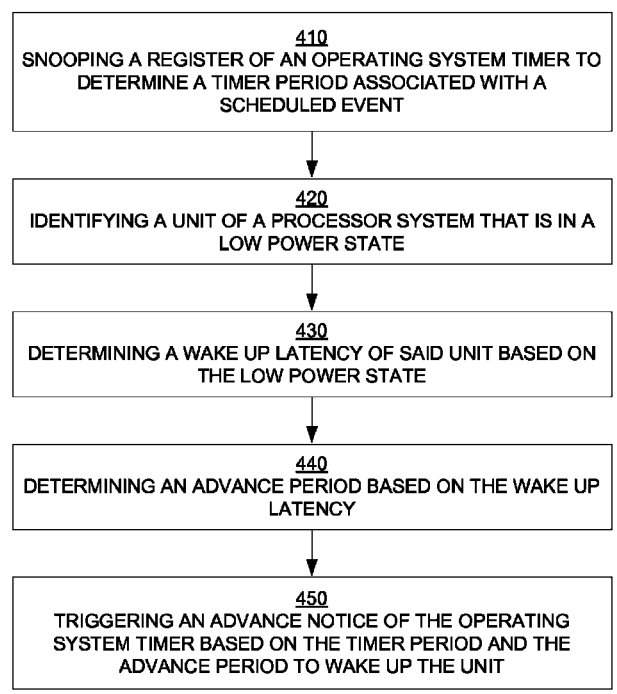
FIG. 4 is a flow diagram illustrating a method for power management that implements a timer advance notice technique for waking up core and other units of a computer system in anticipation of a scheduled wake event, in accordance with one embodiment of the present disclosure.
Figure 5A:
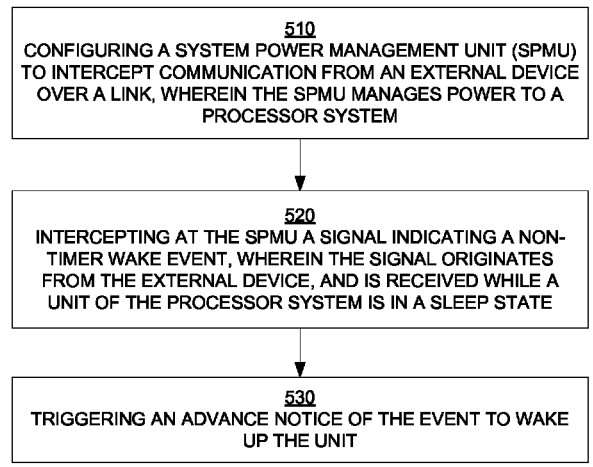
FIG. 5A is a flow diagram illustrating a method for power management that implements a non-timer event triggered wake advance notice technique for waking up core and other units of a computer system in anticipation of an unscheduled wake event, in accordance with one embodiment of the present disclosure.
Figure 6A:
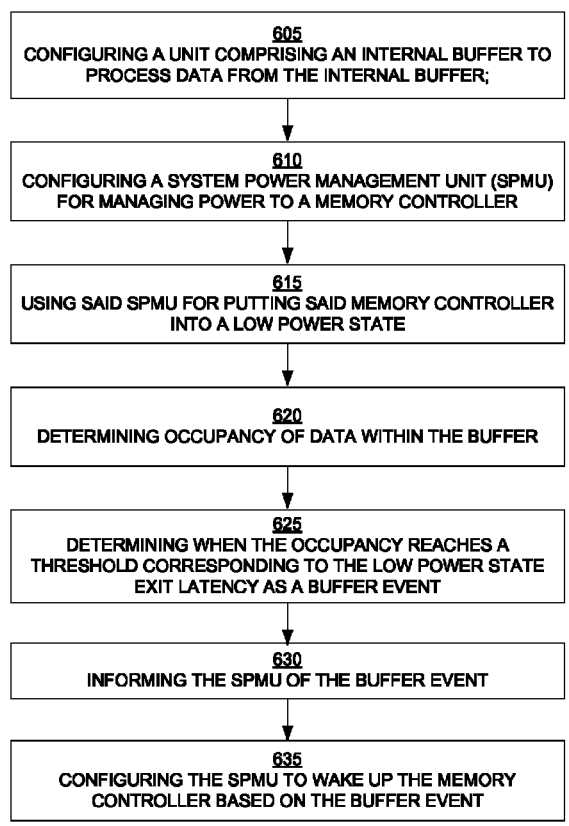
FIG. 6A is a flow diagram illustrating a method for power management that implements a buffer triggered wake advance notice technique for waking up core and other units of a computer system, in accordance with one embodiment of the present disclosure.

FIGS. 4, 5A, and 6A are flowcharts of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments of the present invention described herein are discussed within the context of hardware-based components configured for monitoring and executing instructions. That is, embodiments of the present invention are implemented within hardware devices of a micro-architecture, and are configured for monitoring for critical stall conditions and performing appropriate clock-gating for purposes of power management.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
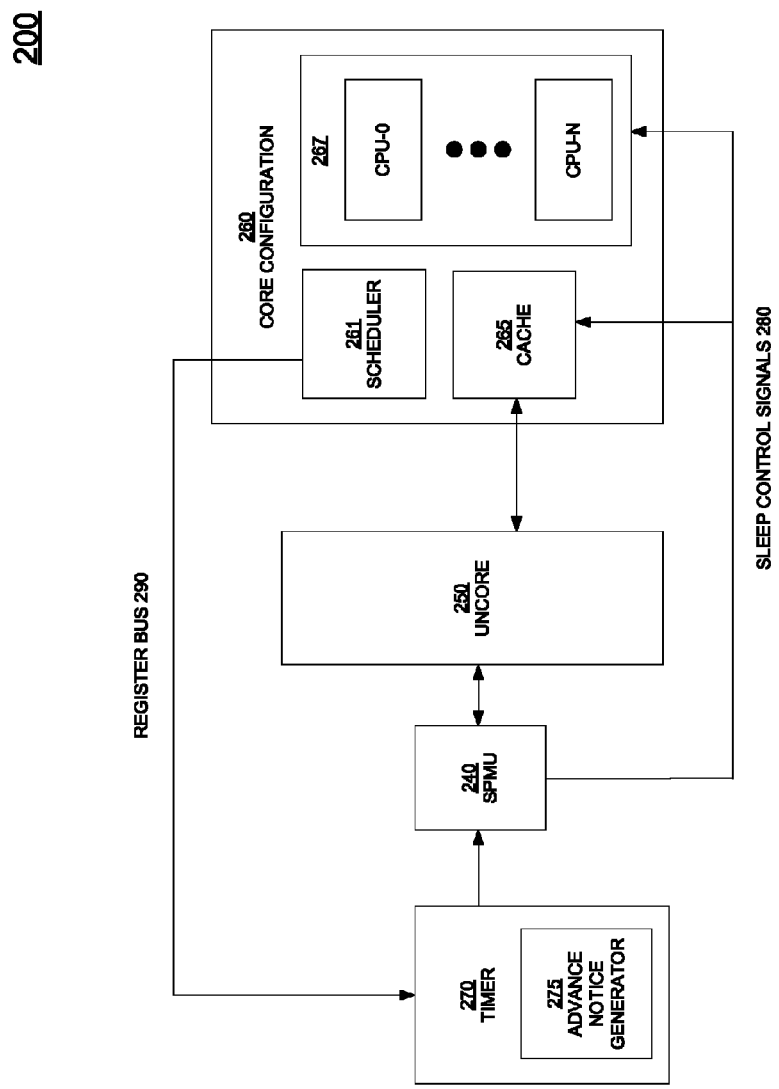
FIG. 2 is a block diagram of an exemplary computer system configured for power management through implementation of a timer advance notice technique for waking up core and other units of the computer system in anticipation of a scheduled wake event, in accordance with one embodiment of the present disclosure.

FIG. 2 is a block diagram of an exemplary computer system 200 configured for power management through implementation of a timer advance notice technique for waking up core and other units of a computer system in anticipation of a scheduled wake event, in accordance with one embodiment of the present disclosure. For instance, computer system is configurable to provide earlier wake up of portions the computer system 200 so that those portions are put into a deeper low power state for purposes of managing power.

As shown in FIG. 2, system 200 includes a core configuration 260 that comprises one or more core components used for executing program instructions. For instance, core configuration 260 includes CPU 267. In one implementation, CPU 267 comprises multiple processor units, such as, CPU-0 to CPU-N. In addition, core configuration 260 includes a cache memory 265 that is used by the various CPUs for local storage of data and instructions. More particularly, cache memory 265 stores copies of data and instructions found in the main memory (not shown) of the computer system 200.

Computer system 200 also includes scheduler 261 which is used to manage access to system resources, to include components of the core configuration 260 and other uncore components. In general, scheduler 261 schedules operating system tasks that are performed by the CPU 260, such as the execution of operations and instructions of the various threads, processes and/or data flows executing across the one or more CPU units of CPU 260. Proper scheduling of tasks manages the sharing of data and hardware resources in a manner that minimizes in activity and latency within the processors of CPU 260.

System 200 also includes uncore 250, which comprises a bridge to the core configuration 260, in that uncore 250 handles communication between the core configuration 260 and devices requesting resources from the core configuration 260. For instance, uncore 250 comprises an interrupt controller (not shown) that is used for handling interrupts being delivered to processors in the core configuration 260. In addition, uncore 250 includes one or more functional units that are not located in the core configuration 260. For instance, uncore 250 may include an arithmetic logic unit, floating point calculator, memory control unit, memory, etc.

System 200 also includes a system power management unit (SPMU) 240. Control of the power use by the various units within system 200 is handled by SPMU 240. More particularly, SPMU 240 is able to independently put the various units within system 200 into one or more low power states, as determined by the real-time demands for each of those units. Also, SPMU 240 is able to wake up or activate those units within system 200 from any of the induced low power states. For instance, SPMU 240 is able to manage power usage of the core configuration 260, and uncore 250. In addition, SPMU 240 is configured to manage power usage by other units and/or components of system 200, such as a memory, memory controller, etc. As previously described, power management is achieved through power gating a power signal or clock gating a clock signal that is distributed to the power controlled units.

Also shown in FIG. 2 is timer 270, which is coupled to scheduler 261 of the core configuration 260. Timer 270 is located on a different power domain than the core configuration 260 so that the timer 270 is still active while the components of core configuration 260 are in a lower power state. More particularly, scheduler 261 of core configuration 260 is configured to generate periodic and/or scheduled interrupts for scheduling the execution of operating system tasks. In one embodiment, scheduler 261 generates a scheduled interrupt that when signaled wakes up one or more units (e.g., core 260 and/or uncore 250) within system 200 and executes a particular task.

For instance, scheduler 261 may communicate with timer 270 over register bus 290 to schedule an interrupt to be signaled at a particular time, or after a time period. In one implementation, a countdown value is placed into a register by timer 270, and is counted down by timer 270. While the timer 270 is counting down the time to determine the moment in time for signaling the interrupt, various units (e.g., core 260 and/or uncore 250) of system 200 may be placed into a low power state. After the interrupt is signaled at the time indicated by timer 270, the interrupt may be delivered to the interrupt controller located in uncore 250 that is configured for handling external interrupts from an external device (e.g., external from the uncore 250 and/or core 260). Typically, after being signaled, the interrupt is held by the interrupt controller until the targeted unit of system 200 is awakened and ready to handle the interrupt. Embodiments of the present invention provide for the advancement of the process to wake up units of system 200 in order to process the scheduled interrupt. That is, rather than waiting for the interrupt to trigger the wake up process, the wake up process is disassociated from the interrupt, and separately triggered through an advance notice by the advance notice generator 275. The advance notice is delivered to the SPMU 240 in order to begin the process of waking up targeted units in system 20. In that manner, when the interrupt is signaled after the timer 270 expires, the units (e.g., core 260 and uncore 250) of system 200 are ready to handle the interrupt.

Figure 3:
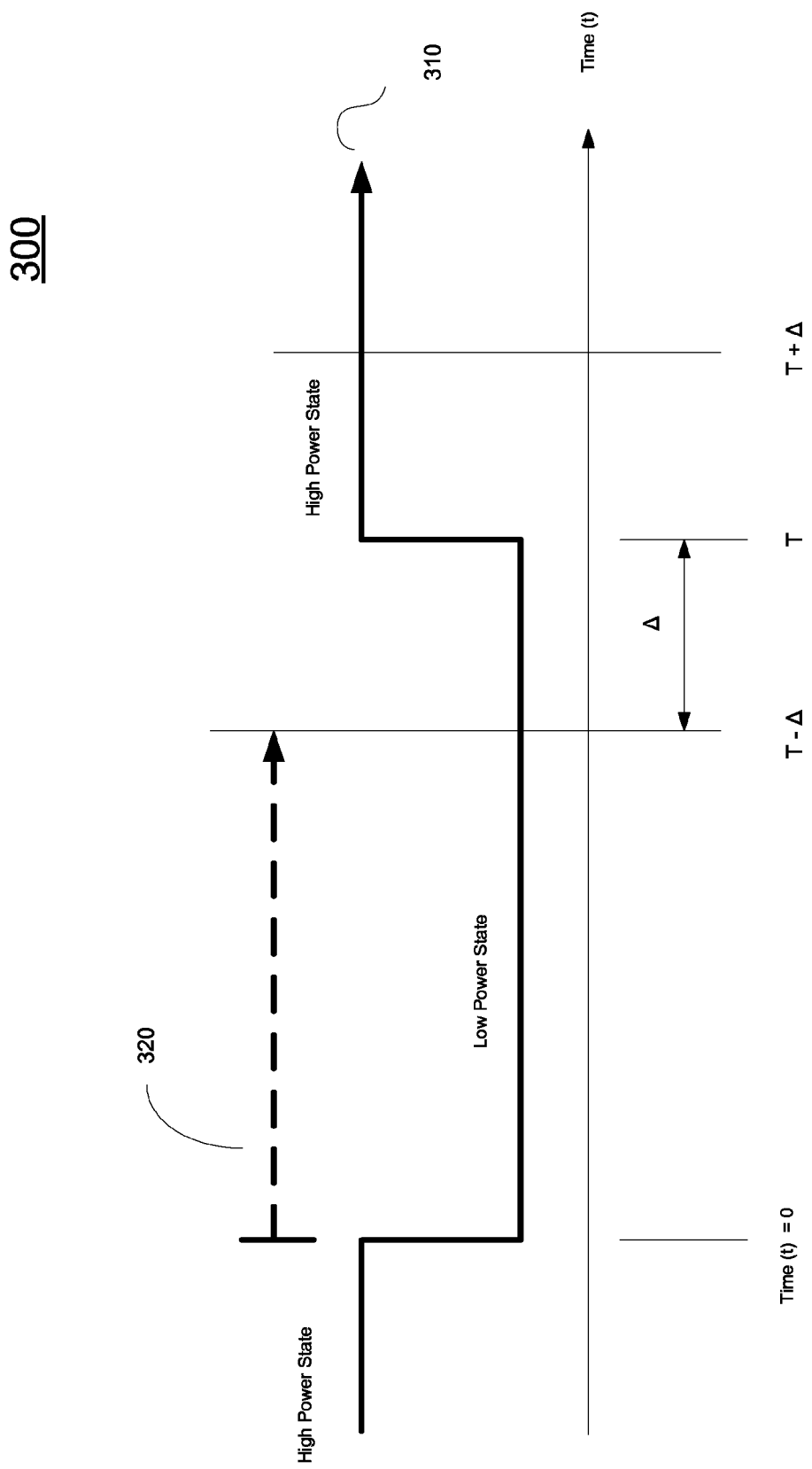
FIG. 3 is a timing diagram illustrating a timer advance notice technique for waking up core and other units of a computer system in anticipation of a scheduled wake event, in accordance with one embodiment of the present disclosure.

FIG. 3 is a timing diagram 300 illustrating a timer advance notice technique for waking up core and other units of a computer system in anticipation of a scheduled wake event, in accordance with one embodiment of the present disclosure. More particularly, the timer advance notice is implemented to wake up (e.g., power-on and restore context) the core configuration and other units of a computer system in anticipation of an upcoming scheduled and/or periodic wake event.

More particularly, diagram 300 illustrates the power usage of one or more targeted units of a computer system, such as the core configuration 260 of computer system 200 of FIG. 2. As shown, line 310 indicates power usage of the one or more units over time. Before time t=0, the unit(s) is in a high power state, where the unit(s) is actively operating. At time t=0, the unit(s) is placed into a low power state. The degree of the low power state is determined by the SPMU after considering various factors, such as wake up latency of the unit(s), required response time of the system, and desired response time of the system. The SPMU will place the unit(s) in the deepest low power state possible for increased power savings.

Before the unit(s) is placed into a lower power state, a wake event is scheduled, in one embodiment. For instance, the wake event is scheduled to occur after a time period "T" over the time line 310. Scheduling may be implemented through a timer, such as a countdown timer. As such, the unit(s) is placed into a low power state at t=0, and is scheduled to wake up after a countdown period T, as determined by a timer that remains active. The timer signals the timer interrupt after the period T has expired, at t=T on timeline 310.

Normally, after the timer interrupt is signaled, the unit(s) of the system must be awakened. A wake up latency period of $\Delta$ defines the amount of time needed to wake up the unit(s). The interrupt is held or continuously sent until(s) after the wake up latency period $\Delta$. Thereafter, the unit(s) is available for handling the interrupt at time t=T+$\Delta$.

On the other hand, embodiments of the present invention, are able to anticipate the occurrence of the signaling of the scheduled interrupt and trigger a wake of the targeted unit or units required to handle the interrupt. In that manner, the targeted unit(s) are immediately available for handling the interrupt. For instance, if the wake up latency is determined to be $\Delta$, then an advance notice is signaled at a time t=T–$\Delta$. In one embodiment, this is implemented through a second timer, as indicated by line 320, which begins approximately at time t=0 and ends at time t=T–$\Delta$. In still other embodiments, any suitable method for determining when to signal the advance notice is contemplated, such as, through calculating a specific time stamp. At that time, the advance notice triggers the wake of the one or more targeted units in the system that are required for handling the interrupt. As such, when the scheduled timer interrupt is signaled, the targeted unit(s) has already been awakened and is ready to handle that interrupt at time t=$\Delta$. In that manner, embodiments of the present invention give the impression that the computer system is always awake and ready to handle interrupts.

FIG. 4 is a flow diagram 400 illustrating a computer implemented method for power management that implements a timer advance notice technique for waking up core and other units of a computer system in anticipation of a scheduled wake event, in accordance with one embodiment of the present disclosure. In another embodiment, flow diagram 400 is implemented within a computer system including a processor and memory coupled to the processor and having stored therein instructions that, if executed by the computer system causes the system to execute a method for power management that implements a timer advance notice technique for waking up core and other units of a computer system in anticipation of a scheduled wake event, in accordance with one embodiment of the present disclosure. In still another embodiment, instructions for performing a method are stored on a non-transitory computer-readable storage medium having computer-executable instructions for causing a computer system to perform a method for power management that implements a timer advance notice technique for waking up core and other units of a computer system in anticipation of a scheduled wake event, in accordance with one embodiment of the present disclosure. The method outlined in flow diagram 400 is implementable by one or more components of the computer system 200 of FIG. 2 to include the SPMU 240 and timer 270.

At 410, implementation of a timer advance notice technique begins by snooping a register of a timer that has been configured by the operating system. For instance, the operating system may configure a future scheduled wake event that is triggered by the timer. That wake event is associated with an interrupt to be handled, in one embodiment. As shown in FIG. 2, the advance notice generator 270 is able to determine that the operating system timer has been configured in a register, and to sniff the value placed in that register. As such, one or more units of the system associated with the operating system may go into a low power state in anticipation of the scheduled wake event.

At 420, the computer implemented method continues by identifying a unit of a computer system that is in a low power state. As previously described, the unit comprises a core configuration (e.g., CPUs, cache memory, etc.) and any other non-core components, which are also referred to as the uncore. For instance, the SPMU 240 of FIG. 2 is configured to determine which unit of a computer system is in a low power state. In one embodiment, the SPMU coordinates when one or more units of the computer system go into a low power state, and in an independent fashion how deep of a low power state to put each of those units.

At 430, a wake up latency is determined for the unit that is the low power state. The wake up latency is the time period required for waking up the unit so that is may process tasks, such as, those assigned by the operating system, or handling interrupts, etc. For instance, SPMU 240 of FIG. 2 is configured to determine the wake up latency. Specifically, the SPMU is configured to determine or receive information related to wake up latency periods for the various units of a corresponding computer system in association with the various low power states for those units. In that manner, the SPMU is also able to determine how deep of a lower power state to put a particular unit, according to various tolerance requirements. For instance, the requirement may be related to a user experience parameter. The greater the tolerance, the deeper the lower power state may be assigned to that unit, and correspondingly the longer it takes to wake up that unit.

At 440, the computer implemented method continues by determining an advance period that is based on the wake up latency of the unit. More particularly, the advance period is used to wake up the unit in time to process the interrupt that is associated with the wake event. In one embodiment, the unit is awakened and active before the interrupt is signaled, such that that unit is ready to handle the interrupt as soon as the interrupt is signaled. In another embodiment, the unit is awakened and active at approximately the same time the interrupt is signaled, such that the unit is ready to handle the interrupt as soon as the interrupt is signaled.

For instance, the advance notice generator 275 of FIG. 2 located in the timer 270 is able to determine the advance period required. In that manner, an advance notice is signaled at the appropriate time such that the unit is awakened and active when the interrupt associated with the wake event is signaled. In one embodiment, an advance notice timer that is based on the timer period and the advance period is configured. For an illustration, FIG. 3 provides that an advance notice timer is configured to begin at approximately time $t=0$ and expire at approximately time $t=T-\Delta$. In one embodiment, the advance notice timer period is approximately the wake up latency of the unit that is placed into a low power state.

At 450, the computer implemented method also includes triggering an advance notice of the operating system timer (i.e., associated with the interrupt and wake event) that is based on the timer period and the advance period in order to wake up the unit placed into the lower power state. The timer period is associated with the triggering of the wake event and interrupt, and the advance period is based on the wake up latency of the unit. Specifically, by activating the advance notice timer and determining when the advance notice timer has expired, the unit is awakened at the expiration of the advance notice timer in time to process the interrupt. For instance, the advance notice generator 275 of FIG. 2 is configured to determine when the advance notice timer has expired and to trigger the signaling of the advance notice in order to wake up the unit.

As such, at the expiration of the timer period that is associated with the interrupt and wake event, the operating system timer is triggered in association with the wake event. This in turn generates an interrupt that is associated with the wake event. Because the unit in the computer system is active and has been pre-awakened, the interrupt can be immediately handled by the unit and is immediately forwarded to the unit for handling.

In another embodiment, multiple units of the computer system are required to handle the wake event. In addition, those units are also placed into a low power state. The wake up latency period for the additional units are also considered when determining the advance period determined to wake up the one or more units. For instance, a second unit of the computer system that is in a second low power state is determined. The low power state of the second unit is independent of the lower power state of the original unit, in one embodiment. That is, the units are placed into low power states independently of each other in one embodiment, and in another embodiment are placed into a similar low power state. A second wake up latency of the second unit is determined based on the second low power state. Thereafter, the advance period is determined considering the second wake up latency. More specifically, the advance period is determined considering the wake up latency of the one or more units that are in low power states, such as, the original unit and the second unit, etc.

For example, in a system that includes a core and uncore configurations, an advance notice timer is generated considering the wake up latencies of both the core and the uncore. For illustration, the wake up latency for the core is labeled "M," and the wake up latency for the uncore is labeled "N." Typically, the wake up process will wake up the core and uncore configurations in a serial process, such as, first waking up uncore and then waking up core. As such, if the uncore configuration is in a low power state, then it would take an N period before the interrupt controller is able to handle a scheduled or timer interrupt (e.g., associated with the wake event). After receiving the interrupt, the interrupt controller in the uncore would trigger the waking up of the core, which will take an additional M period. As such, by triggering an advance notice timer that is based on the wake up periods of M+N of the core and uncore, both of those units are able to handle the timer interrupt as soon as it is signaled.

In the above example, two layers of lower power states associated with the core and the uncore configurations are illustrated. In that case, the advance notice timer is based on the wake up latencies of both the layers. In other embodiments, there are more than two layers of low power states, for example to accommodate for core, uncore, memory controller, etc. configurations. In those cases, the advance notice timer is based on the wake up latencies of all the layers of low power states. For instance, for three layers, where "M" is the wake up latency for the core configuration, "N" is the wake up latency for the uncore configuration, and "O" is the wake up latency for the memory controller, the advance notice timer is based on the wake up periods of M+N+O.

Figure 5B:
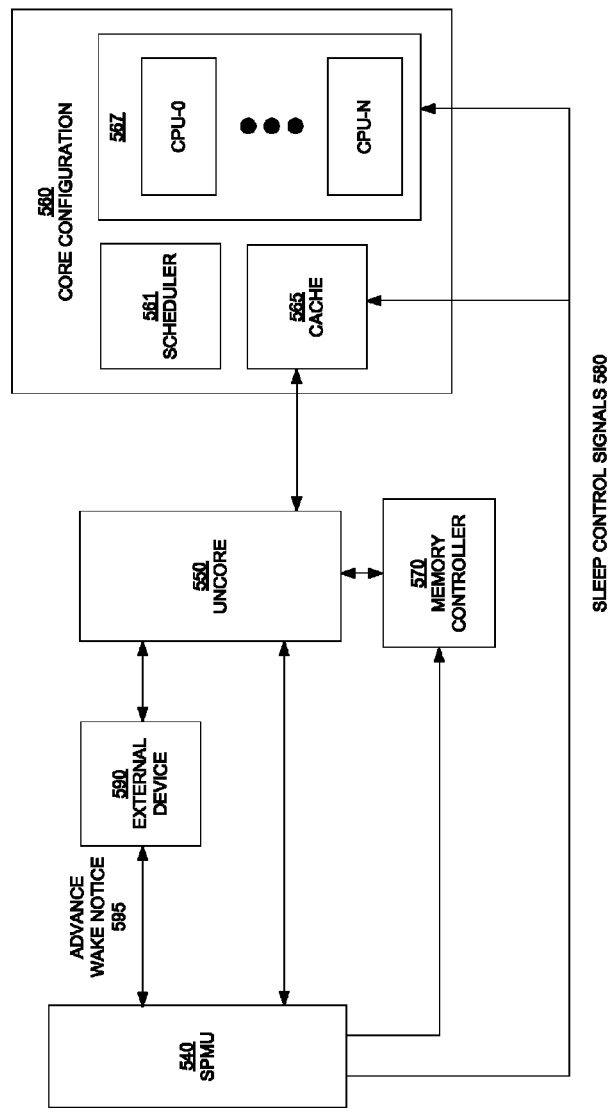
FIG. 5B is a block diagram of an exemplary processor system configured for power management through implementation of a non-timer event triggered wake advance notice technique for waking up core and other units of a computer system in anticipation of an unscheduled wake event, in accordance with one embodiment of the present disclosure.

FIGS. 5A-B combined illustrate a non-timer event triggered wake advance notice implemented for handling communications from external devices when one or more units of a computer system are in low power states. Specifically, FIG. 5A is a flow diagram 500A illustrating a computer implemented method for power management that implements a non-timer event triggered wake advance notice technique for waking up core and other units of a computer system in anticipation of an unscheduled wake event, in accordance with one embodiment of the present disclosure. In another embodiment, flow diagram 500 is implemented within a computer system including a processor and memory coupled to the processor and having stored therein instructions that, if executed by the computer system causes the system to execute a method for power management that implements a non-timer event triggered wake advance notice technique for waking up core and other units of a computer system in anticipation of an unscheduled wake event, in accordance with one embodiment of the present disclosure. In still another embodiment, instructions for performing a method are stored on a non-transitory computer-readable storage medium having computer-executable instructions for causing a computer system to perform a method for power management that implements a non-timer event triggered wake advance notice technique for waking up core and other units of a computer system in anticipation of an unscheduled wake event, in accordance with one embodiment of the present disclosure.

The method outlined in flow diagram 500 is implementable by one or more components of the computer system 500B of FIG. 5B to include the SPMU 540. More specifically, FIG. 5B is a block diagram of an exemplary computer system 500B configured for power management through implementation of a wake advance notice technique for waking up core and other units of a computer system in anticipation of an unscheduled wake event, in accordance with one embodiment of the present disclosure. In particular, system 500B includes a core configuration 560 that comprises one or more core components used for executing program instructions. For instance, core configuration 560 includes CPU 567 comprising CPU-0 to CPU-N, cache memory 565 that is used by the various CPUs for local storage of data and instructions. Core 560 also includes a scheduler 561 which is used to manage access to system resources, to include components of the core configuration 560 and other uncore components. System 500B also includes uncore 550, which comprises a bridge to the core configuration 560, in that uncore 550 handles communication between the core configuration 560 and devices requesting resources from the core configuration 560.

System 500B also includes a system power management unit (SPMU) 540 that is configured to independently put the various units within system 500B into one or more low power states, as determined by the real-time demands for each of those units. Also, SPMU 540 is able to wake up or activate those units within system 500B from any of the induced low power states. For instance, SPMU 540 is able to manage power usage of the core configuration 560, and uncore 550. In addition, SPMU 540 is configured to manage power usage by other units and/or components of system 500B, such as a memory, memory controller 570, etc. More particularly, SPMU is configured to trigger advance notice of a non-timer wake event, wherein the event is used directly to trigger the start waking up the units that are in low power states without receiving an input/output (I/O) transaction (e.g., interrupt or direct memory access request).

Turning now to flow diagram 500A, at 510, the computer implemented method includes configuring an SPMU to intercept communication from an external device that is communicating over a link. The SPMU coordinates when one or more units of the computer system go into a low power state, and in an independent fashion how deep of a low power state to put each of those units. For instance, the external device may be a USB port or USB pad that is communicating with the other units of the computer system over a link. The SPMU is able to intercept communications over the link to determine when an external device is communicating. As an example, SPMU 540 of FIG. 5B is configured to intercept the communication from the external device 590.

At 520, the computer implemented method also includes intercepting at the SPMU a signal indicating a non-timer wake event, wherein the signal originates from the external device. In addition, the signal is received while a unit of the computer system is in a low power state. As an example, the non-timer wake event may be the plugging in of the external device to a USB slot while a unit of the computer system is in a low power state. For instance, SPMU 540 of FIG. 5B is configured to intercept the communication from the external device 590. In one embodiment, the communication is also delivered to the uncore 550.

At 530, an advance notice of the non-timer wake event is triggered to wake up the unit. For instance, the SPMU 540 may trigger the advance notice to wake up the uncore 550, memory controller 570, core configuration 560, or any other unit of the computer system 500B. In one embodiment, the advance notice wakes up all units that are in a low power state even though the wake event may not be targeted to all those units. This allows all units of the computer system 500B to go into deeper low power state than originally designed.

In addition, in one embodiment, the signal is held by the SPMU until after the unit is fully activated. That is, the signal is not delivered to the uncore 550 in typical fashion. In another embodiment, the signal is not held, but allowed to proceed as if the signal were not intercepted by the SPMU. Once the targeted unit is active, the signal is processed at the event handler of the uncore 550 to generate an I/O transaction for the targeted unit.

Figure 6B:
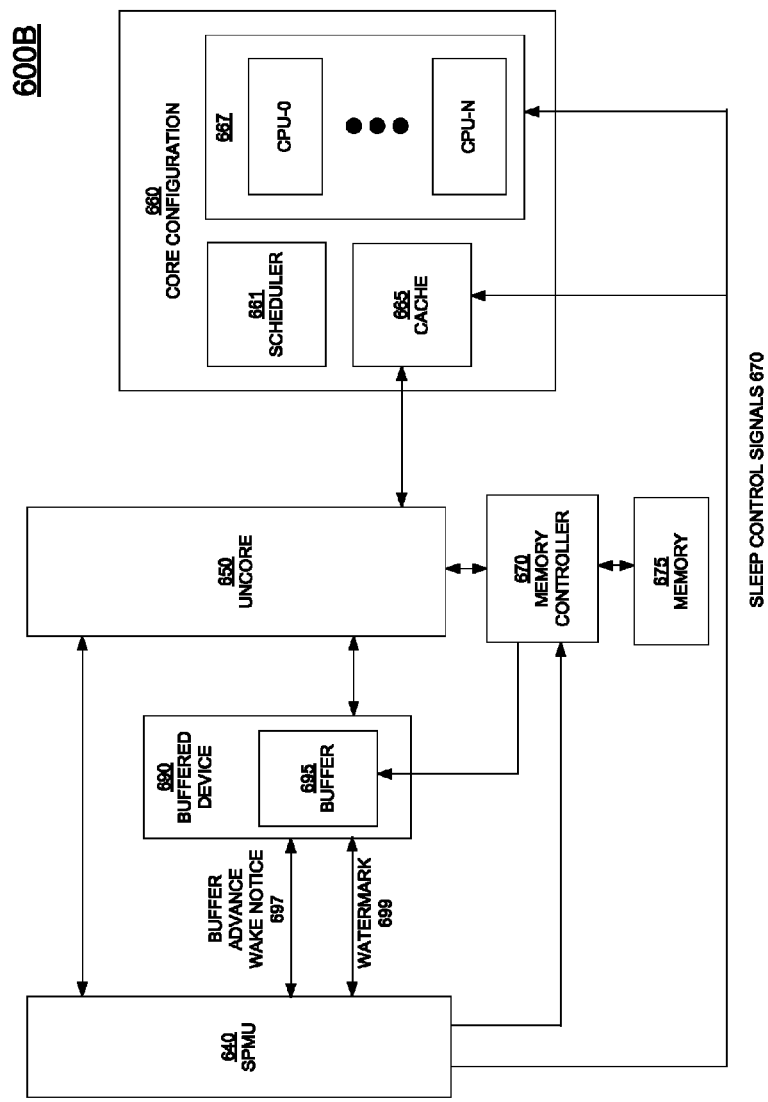
FIG. 6B is a block diagram of an exemplary processor system configured for power management through implementation of a buffer triggered wake advance notice technique for waking up core and other units of a computer system, in accordance with one embodiment of the present disclosure.

FIGS. 6A-B combined illustrate a buffer triggered wake advance notice implemented for handling requests for data to fill a buffer when one or more units of a computer system are in low power states. Specifically, FIG. 6A is a flow diagram 600A illustrating a method for power management that implements a buffer triggered wake advance notice technique for waking up core and other units of a computer system, in accordance with one embodiment of the present disclosure. In another embodiment, flow diagram 600A is implemented within a computer system including a processor and memory coupled to the processor and having stored therein instructions that, if executed by the computer system causes the system to execute a method for power management that implements a buffer triggered wake advance notice technique for waking up core and other units of a computer system, in accordance with one embodiment of the present disclosure. In still another embodiment, instructions for performing a method are stored on a non-transitory computer-readable storage medium having computer-executable instructions for causing a computer system to perform a method for power management that implements a buffer triggered wake advance notice technique for waking up core and other units of a computer system, in accordance with one embodiment of the present disclosure.

The method outlined in flow diagram 600 is implementable by one or more components of the computer system 600B of FIG. 6B to include the SPMU 640. More specifically, FIG. 6B is a block diagram of an exemplary computer system 600B configured for power management through implementation of a buffer triggered advance notice technique for waking up core and other units of a computer system in preparation of receiving data in the buffer, in accordance with one embodiment of the present disclosure. In particular, system 600B includes a core configuration 660 that comprises one or more core components used for executing program instructions. For instance, core configuration 660 includes CPU 667 comprising CPU-0 to CPU-N, cache memory 665 that is used by the various CPUs for local storage of data and instructions. Core 660 also includes a scheduler 661 which is used to manage access to system resources, to include components of the core configuration 6600 and other uncore components. System 600B also includes uncore 650, which comprises a bridge to the core configuration 660, in that uncore 650 handles communication between the core configuration 660 and devices requesting resources from the core configuration 660.

System 600B also includes a system power management unit (SPMU) 640 that is configured to independently put the various units within system 600B into one or more low power states, as determined by the real-time demands for each of those units. Also, SPMU 640 is able to wake up or activate those units within system 600B from any of the induced low power states. For instance, SPMU 640 is able to manage power usage of the core configuration 660, and uncore 650. In addition, SPMU 640 is configured to manage power usage by other units and/or components of system 600B, such as a memory, memory controller 570, memory 675, etc.

More particularly, SPMU 640 is configured to monitor for buffer occupancy of a buffered device 690 (e.g., display, etc.) in order to trigger advance notice 697 of a request for data to fill the buffer 695, wherein the advance notice 697 is used directly to wake up units that are in low power states. A buffer of sufficient size allows for those units to be placed into low power states while the data in the buffer is processed. Advance notice of the request for additional data to fill the buffer is received by the SPMU 640 from the buffered device 690. In that manner, when the request for data is delivered, the memory controller 670 is awake and can immediately handle the request.

For instance, SPMU 640 is configured to receive an indication that occupancy of the buffer has reached a watermark 699 or threshold, thereby indicating that soon the buffer 695 will become depleted and that the buffered device 690 will soon make a request to the memory controller 670 for additional data to fill the buffer. Advance notice of the request in the form of a buffer advance wake notice 697 is received by the SPMU 640 when the watermark is reached in order to awaken the memory controller 670. In one embodiment, SPMU 640 is configured to determine where to place the watermark depending on how deep of a low power state the SPMU 640 has placed the memory controller 670 and/or memory 675.

Turning now to flow diagram 600B of FIG. 6B, at 605, the method for power management includes configuring a unit to process data from an internal buffer. For instance, the buffer is of sufficient size to allow the unit to operate independently for a period of time using the data within the buffer. Other units within the computer system may be placed in a low power state during the period when the buffered data is processed by the unit. For instance, the unit may be a display that is configured to display images from a buffer while other units (e.g., memory controller and memory) are in a low power state, such as, when the computer system is in an idle state. Other examples include an encryption unit that encrypts and/or decrypts data located within a buffer or an audio unit that outputs audio from buffered data. In all of the above examples, processing of the buffered data occurs while other units of the computer system are in a low power state. By providing a buffer of sufficient size and an advance notice indicating the state of the buffer occupancy, other units of the computer system may be placed into deeper low power states.

At 610, the computer implemented method includes configuring an SPMU to coordinate when a memory controller goes into a low power state, and in an independent fashion how deep of a low power state to place that memory controller. For instance, the SPMU may place the memory controller in a deeper state, that requires a longer wake up latency period, as long as there is sufficient advance notice of the depletion of the buffer and subsequent request for additional data. As such, the SPMU is configured to determine when to trigger the advance notice (e.g., placement of a watermark in the buffer) depending on how deep the low power state. For example, for shallow low power states, the SPMU may configure the watermark to be placed nearer to the depletion of the buffer, whereas for deeper low power states, the SPMU may configure the watermark to be placed further away from the depletion of the buffer. For deeper low power states, more time is required to wake up the memory controller than for shallower low power states.

At 615, the computer implemented method also includes using the SPMU to put the memory controller and/or memory into a low power state. That is, the SPMU is configured to determine when to put the memory controller and/or memory into a low power state, and the depth of the low power state. Depending on the depth of the low power state, and knowing the wake up latencies of the memory controller and/or memory, the SPMU can determine how much of an advance notice is required in order to awaken the memory controller and/or memory so that is prepared to receive a request for additional data to fill the buffer.

At 620, the computer implemented method includes determining occupancy of the data within the buffer. More particularly, occupancy is monitored to determine when to trigger the advance notice. In another embodiment, the SPMU is configured to monitor the occupancy of the buffer. For instance, the SPMU is configured to place a watermark in the buffer at a point when the advance notice should be generated.

At 625, the computer implemented method includes determining when the occupancy of the buffer reaches a threshold as a buffer event, wherein the threshold corresponds to the low power state exit latency. The act of reaching the threshold or watermark corresponds to the low power state of the memory controller, or more particularly, the point at which there is sufficient time for the memory controller to be awakened from a low power state in time to process a forthcoming request for data to fill the buffer. As such, the buffer event corresponds to the buffer advance wake notice.

At 630, the SPMU is informed of the buffer event. In one embodiment, the buffered device provides notification to the SPMU when the watermark is reached. In another embodiment, the SPMU is configured to monitor the occupancy of the buffer. Once the SPMU is notified, the SPMU is configured to wake up the memory controller. As such, based on the buffer event of reaching the threshold of the buffer, an advance notice is generated allowing the SPMU to start the wake up process of the memory controller. Thereafter, when the request is delivered from the unit to the memory controller for data to fill the buffer, the newly awakened memory controller is ready to process that request.

Thus, according to embodiments of the present disclosure, systems and methods are described in which advance notice is provided of various events, such as, scheduled wake events, unscheduled wake events, and buffer triggers, in order to awaken units of a computer system required to process those events.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A method for power management, comprising:
    snooping a register of an operating system timer to determine a timer period associated with a scheduled event;
    identifying a first unit of a computer system that is in a first low power state;
    determining a first wake up latency of said first unit based on said first low power state;
    determining a second unit of said processor system that is in a second low power state;
    determining a second wake up latency of said second unit based on said second low power state;
    determining an advance period by summing said first wake up latency and said second wake up latency; and
    triggering an advance notice of said operating system timer based on said timer period and said advance period to wake up said first and second units.

2. The method of claim 1, further comprising:
    determining said operating system timer has been configured in said register.

3. The method of claim 1, further comprising:
    configuring an advance notice timer based on said timer period and said advance period; and
    determining said advance notice timer has expired to trigger said advance notice.

4. The method of claim 1, further comprising:
    triggering said operating system timer when said operating system timer has expired;
    generating an interrupt associated with said event; and
    forwarding said interrupt to said first and second units for handling.

5. The method of claim 1, wherein said first unit comprises a core configuration.

6. The method of claim 1, wherein said first unit comprises an uncore configuration.

7. The method of 1, wherein said first unit and second unit comprise a core configuration and an uncore configuration of said processor system.

* * * * *